June 9, 1942. T. L. HEDGPETH 2,285,713
JIG SAW
Filed June 28, 1940 3 Sheets-Sheet 1
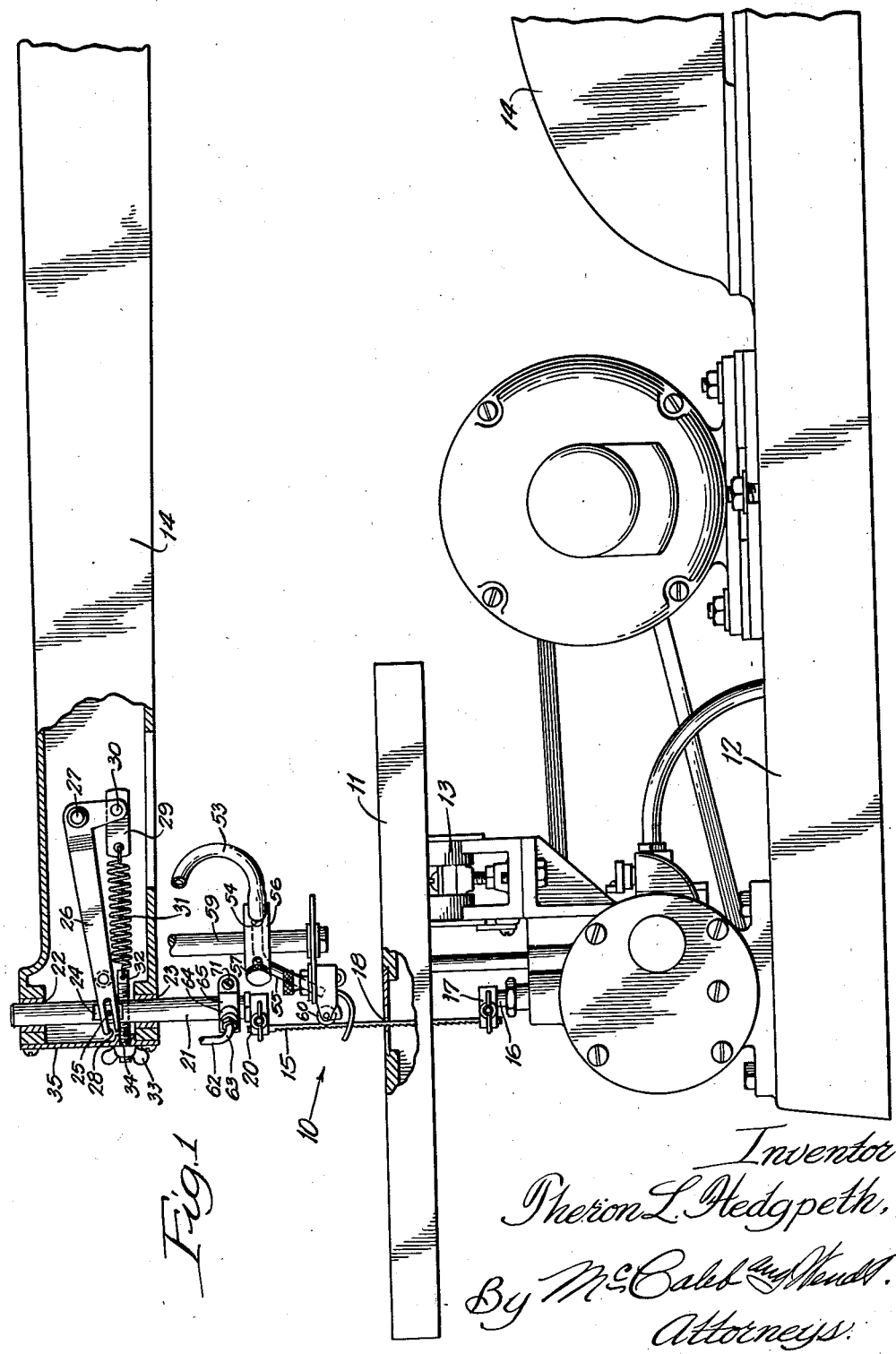
Inventor:
Theron L. Hedgpeth,
By McCaleb and Hendt.
Attorneys.

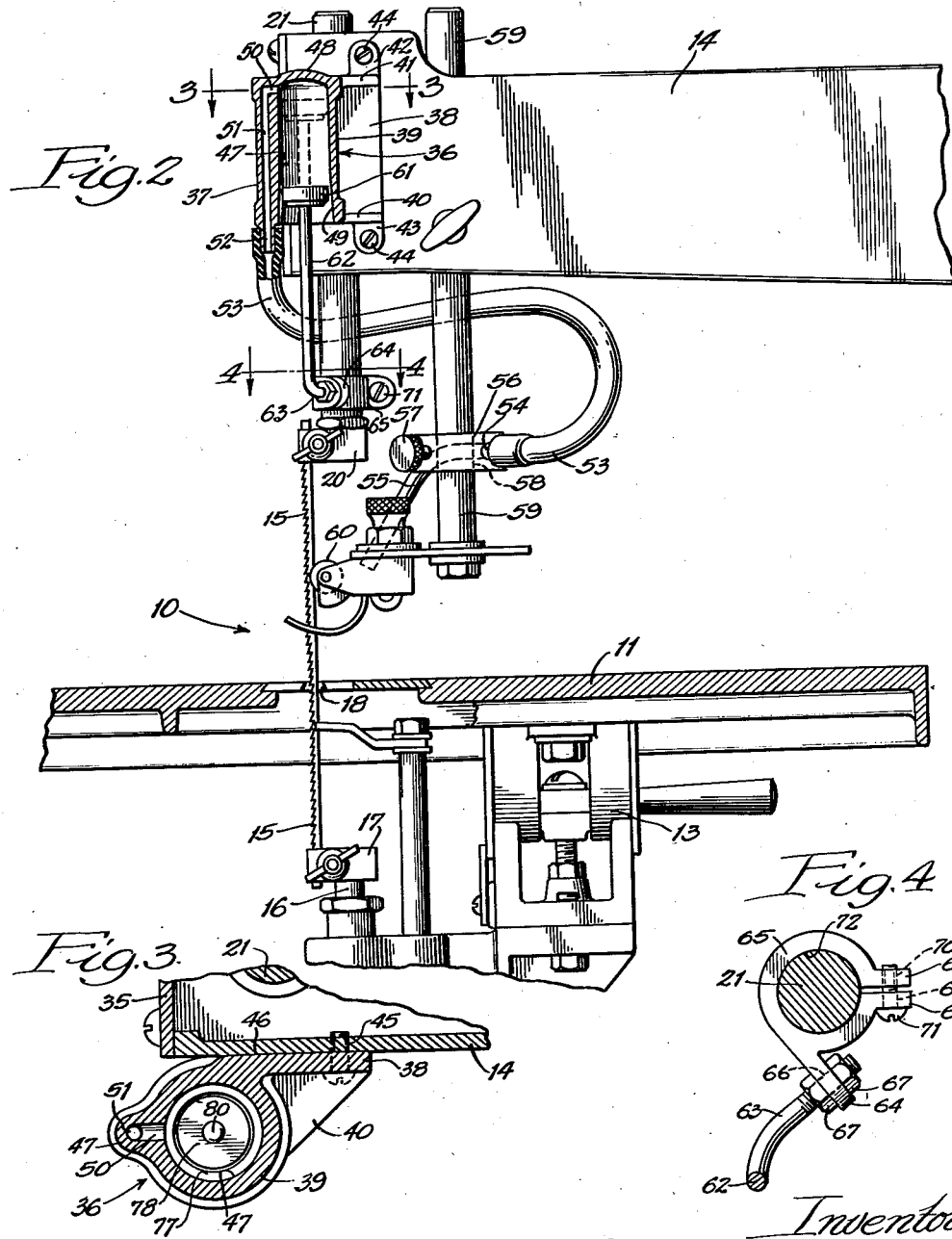

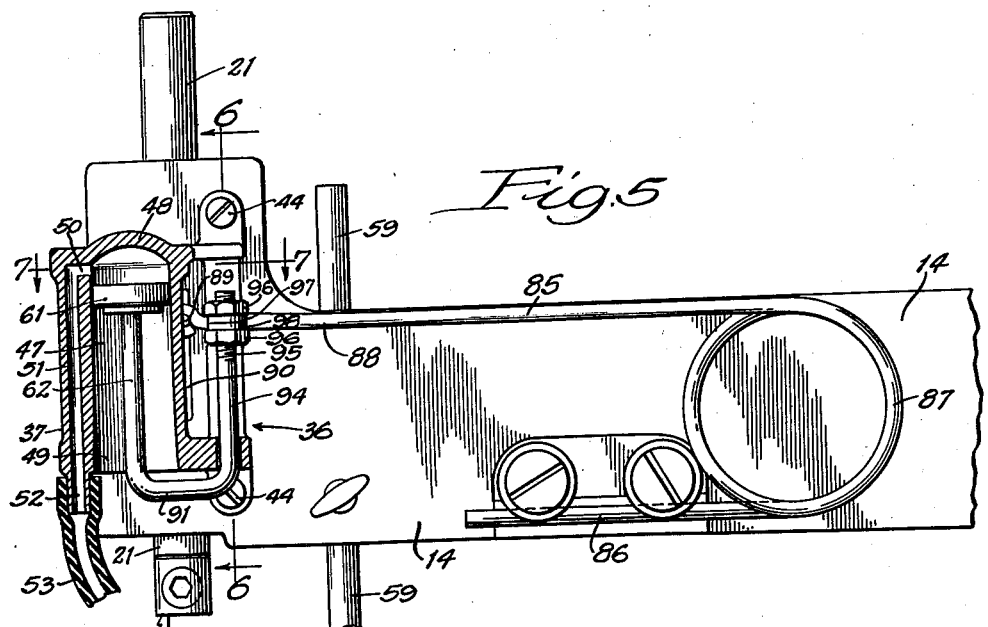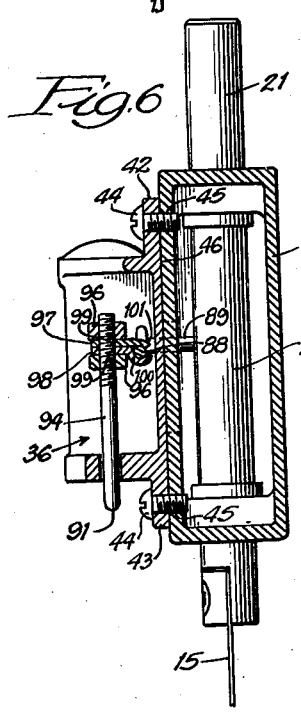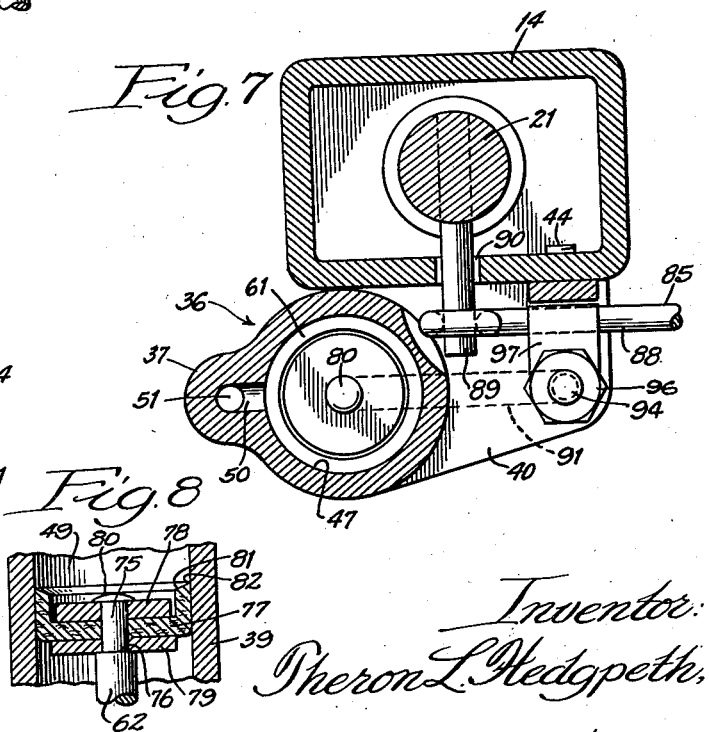

Patented June 9, 1942

2,285,713

UNITED STATES PATENT OFFICE 2,285,713

JIG SAW

Theron L. Hedgpeth, Oak Park, Ill., assignor to Duro Metal Products Company, Chicago, Ill., a corporation of Illinois Application June 28, 1940, Serial No. 342,870

2 Claims. (Cl. 143—157)

The present invention relates to jig saws, and is particularly concerned with improvements in devices for blowing away the saw dust from the work as the jig saw is operating.

One of the objects of the invention is the provision of an improved air pumping arrangement for jig saws, which is adapted to have its working stroke operated on the spring actuated stroke of the jig saw blade, for the purpose of relieving the strain on the blade, and effecting a cleaning of the work at the saw as the blade rises.

The devices of the prior art designed for the purpose of blowing away the saw dust are either provided with expensive pumps that are connected with the driving mechanism below the working table, or they are provided with pumping arrangements adapted to be actuated on the down stroke of the saw. The former devices are subject to the disadvantage that they are relatively expensive and increase considerably the cost of the complete jig saw, and the latter devices are subject to the disadvantage that the power stroke of the pump takes place on the down stroke of the saw, thus placing an additional strain on the saw blade, which is already frequently subjected to too much strain by unskilled operators.

The down stroke of the saw is primarily a cutting stroke, while the up stroke of the saw is utilized as a cleaning stroke. While the jig saw may be operated so that there is substantially continuous pulsating flow of air from its air pump, when the saw is operated more slowly the present cleaning blast has the additional advantage that it coincides with the cleaning stroke of the saw blade, as the up stroke of the saw blade takes place at the same time when the piston of the pump is actuated to drive air out of the nozzle and blow away the saw dust.

Therefore, another object of the invention is the provision of an improved pumping arrangement for jig saws by means of which the additional strain that is placed upon the saw blades by the devices of the prior art is eliminated.

Another object of the invention is the provision of an improved air pump for jig saws, which is simple, durable, capable of economical manufacture, and which includes a minimum number of moving parts so that it may be manufactured at a low cost and placed within the price range of a larger number of purchasers, and so that it may be used for a long period of time, without necessity for repair.

Another object of the invention is the provision of improved pumping arrangements which are adapted to be attached to the existing jig saws of various types, with a minimum amount of machine work or changes in existing structures.

Other objects and advantages of the invention will be apparent from the following description and the accompanying drawings, in which similar characters of reference indicate similar parts throughout the several views.

Referring to the two sheets of drawings accompanying this specification,

Fig. 1 is a side elevational view in partial section of a jig saw provided with an air pump constructed according to the present invention, with parts of the jig saw in section;

Fig. 2 is a fragmentary elevational view of the jig saw of Fig. 1, with the air pump shown in section along a plane passing through the axis of the cylinder;

Fig. 3 is a fragmentary sectional view taken on the plane of the line 3—3 of Fig. 2, looking in the direction of the arrows;

Fig. 4 is a fragmentary sectional view taken on the plane of the line 4—4 of Fig. 2, looking in the direction of the arrows;

Fig. 5 is a fragmentary sectional view of a part of a jig saw and an air pump constructed according to the invention, applied to a jig saw of the type having a forwardly extending wire spring for actuating the upper end of the blade;

Fig. 6 is a fragmentary sectional view, taken on the plane of the line 6—6 of Fig. 5;

Fig. 7 is a fragmentary sectional view, taken on the plane of the line 7—7 of Fig. 5, looking in the direction of the arrows;

Fig. 8 is a fragmentary vertical sectional view, taken through the cylinder and piston, showing the details of construction of the piston.

Referring to Fig. 1, 10 indicates in its entirety a jig saw, which is adapted to be equipped with a new pumping arrangement constructed according to the invention.

The jig saw customarily includes a work table 11, suitably supported upon a base 12, with suitable arrangements for angular adjustment of the work table 11, by means of trunnions 13. The base 12 usually supports a column, as shown, which carries a forwardly extending arm 14 for supporting the mechanism for guiding the upper end of a saw blade 15. The base also supports a suitable driving mechanism for reciprocating the lower reciprocating member 16, such as a reciprocating plunger provided with suitable means 17 for clamping one end of the blade 15.

The table 11 is provided with an aperture 18 for passing the saw blade, and it is that portion of the table surrounding the aperture 18, toward which the blast of air from the air pump is to be directed to blow away the saw dust.

At its upper end the saw blade is gripped by a similar clamping device 20 carried by a reciprocating member 21, such as a plunger. The plunger 21 is slidably mounted in bearings 22, 23 in the arm 14, and it is provided with a slot 24 and a pin 25 for engaging a bifurcated bell-crank lever arm 26, which is pivotally mounted on a pin 27 carried by the arm 14.

The bell crank lever 26 has its bifurcated portions provided with a slot 28 embracing the pin 25 on each side of the plunger 21, and this lever has its opposite end pivotally connected to a metal strap 29 by a loose rivet 30.

The strap 29 has an aperture into which one end of a helical coil spring 31 is hooked, the other end being hooked in an aperture in a threaded bolt 32, which has a thumb nut 33 located outside an aperture 34 in the cover plate 35 at the end of the hollow arm 14.

Spring 31 urges the bell crank lever 26 in a clock-wise direction, which in turn urges the plunger 21 upward, maintaining the tension of the saw blade 15. It is the spring 31 which is designed in the embodiment of Fig. 1 to actuate the pump on its working stroke, that is, the upward stroke of the saw blade 15.

The air pump attachment, which is indicated in its entirety by the numeral 36, may comprise a cast metal member of substantially cylindrical shape, provided with a laterally projecting rib formation 37, and with a tangentially extending attaching flange 38. The attaching flange is integrally joined to the cylindrical body 39 at its end, and is also joined thereto by a pair of triangular reinforcing flanges 40, 41 at the top and the bottom of the cylinder. Upwardly and downwardly extending attachment ears 42, 43 are provided with apertures for receiving the screw bolts 44, which pass through the apertures, and are threaded into threaded bores 45 in the wall of the jig saw arm 14.

The face 46 of the attachment flange 36 is substantially flat so that it may be brought into firm engagement with the side of the jig saw arm 14, or the surface 46 is preferably complementary to the face of the arm 14 at the point of its attachment.

The cylindrical body 39 of the pump attachment 36 is provided with an axially extending round bore 47, which is preferably provided with an opening at the lower end, and which is closed at its upper end by the wall 48.

This round bore may be substantially cylindrical at its upper end portion 47, but at its lower portion it is preferably enlarged or tapered, or made substantially frusto-conical at 49, for a purpose further to be described.

At its upper end the bore 47 communicates through a small radially extending bore 50, with a longitudinally extending cored conduit 51 that extends down the side of the cylindrical body 39, inside the rib 37. The rib 37 preferably is extended downward in the form of a cylindrical extension at 52, forming an extension conduit 51, which is adapted to receive the end of a rubber hose 53, which is frictionally mounted on the projecting conduit part 52.

The hose 53 preferably comprises a tubular rubber body made of live resilient rubber, which can be stretched to fit on the member 52, and also for application to the rear end portion 54 of tubular metal nozzle 55.

The tubular metal nozzle may comprise a metal tube that is fixedly secured in a metal block 56, through which it passes, the metal block being provided with a threaded bore for receiving a thumb screw 57, and with a vertically extending bore 58 for receiving the supporting rod 59 that holds the guide roller 60 of the jig saw.

By means of the block 56 the nozzle tube 55 may be supported in any of a plurality of vertical or radial positions on the guide 59 and clamped in place by the thumb screw 57, which passes through a threaded bore in the block 56 and engages the rod 59.

The tube 55 is preferably bent downwardly so that its discharge end is directed toward the surface of the table substantially at the aperture 18, through which the saw blade passes.

The cylinder 39 is provided with a piston 61 fixedly mounted upon a connecting rod 62, which has its laterally bent end portion 63 secured to an attachment flange 64 carried by a split metal collar 65. The laterally bent end 63 of the connecting rod 62 may be threaded so that it may be passed through an aperture 66 in the flange 64 and secured in place by the nuts 67 on opposite sides of the flange.

The length of the laterally extending end portion 63 is such that when the collar 65 is clamped on the plunger 21, the connecting rod 62 extends parallel to the axis of the plunger 21, when the piston 61 is in the cylinder 39.

The split collar 65 may comprise a metal member of annular shape, having the attaching flange 64, and having a pair of spaced radially extending flanges 68 provided with the apertures 69 and 70. The aperture 70 is threaded, while the aperture 69 is adapted to pass the screw bolt 71, which is threaded into the aperture 70.

The flanges 68 are spaced from each other when the bore 72 of the collar 65 is first placed on the plunger 21, and the screw bolt 71 is adapted to draw the flanges 68 together to clamp the collar on the plunger 21.

The piston 61 is preferably of such a type that it may act not only as a piston, but also as a valve, and it is shown in greater detail in Fig. 8. The piston rod 62 may be provided with an end portion of reduced cylindrical shape, shown at 75, and an annular shoulder 76.

A leather cup member 77 and two circular metal washers 78, 79 are provided with centrally located apertures for passing the reduced portion 75.

The flat body portion of the cup leather 77 is clamped between the washers 78 and 79, and the end of the reduced portion 75 is riveted over at 80 so that the assembly 77, 78, 79 is clamped between the riveted portion 80 and the shoulder 76.

The inner washer 78 is adapted to reinforce the cup leather 77 and prevent it from collapsing inward, and the outer washer 79 is adapted to reinforce the flat body of the cup leather 77 to prevent it from being distorted on the piston rod 62.

The cup leather 77 has its outer cylindrical flange beveled at 81 so that its upper edge has a sharp knife edge 82, which is annular in plan, and which engages the inner cylinder wall. The piston 61 may be a substantial fit in the upper cylindrical portion of the bore 47, but has a clearance with the enlarged tapered portion 49 at the bottom of the bore 47.

The operation of the pump so far described is as follows: The driving mechanism of the jig saw, which is attached to the plunger or reciprocating member 16, causes this member to move up and down, or to reciprocate at a fast rate of speed. This causes the saw blade 15 to reciprocate, pulling the plunger 21 downward against the action of the spring 31, working on the bell-crank 26. The spring 31 and bell-crank 26 draw the plunger 21 upward; when the blade 15 is permitted to move upward by the reciprocating member 16, the pump rod 62 moves with the plunger 21 at all times, by reason of the fact that it is clamped to the plunger 21 by the collar 65.

On the down stroke of the piston 61, the piston 61 tends to draw air into the cylinder bore 47; but, as the conduit 51 is a small and restricted one, there is considerable resistance to the inrush of air through this conduit.

This causes a certain degree of vacuum in the cylinder bore 47 above the piston 61, and the air pressure below the piston causes the air to enter from below, around the cup leather 82.

As the piston 61 approaches the lower end of the bore 47, which is enlarged at 49, there is a further clearance between the piston 61 and the bore, to permit air to enter to the upper side of the piston. Thus the piston acts as a valve on the down stroke to permit air to enter the cylinder.

On the up stroke, air pressure is created in the cylinder and above the piston, and this tends to drive the thin knife edge 82 of the cup leather 87, out into engagement with the wall of the cylinder, even at the lower enlarged end of the cylinder.

The air pressure induces tight engagement between the cup leather and the wall of the cylinder on the up stroke, and the tightness of this engagement increases as the piston approaches the upper end and comes into the smaller cylindrical part of the bore 47. Thus the cup leather on the piston acts to close the clearance between the piston and the cylinder wall on the up stroke, and the air is compressed in the cylinder above the piston, and driven out of the conduit 51 through hose 53, and discharged at the end 60 of the nozzle 55.

Referring to Figs. 5 to 7, these are views showing a modification adapted to be applied to a jig saw of the type having a wire spring 85 carried externally by the upper arm 14 of the jig saw.

In this case the spring 85 has a short, straight supporting portion 86 and a plurality of helical coils 87, and an elongated arm 88 substantially parallel to the portion 86, and having engagement with a pin 89 projecting laterally from a slot 90 in the arm 14 and carried by the upper plunger 21 of the jig saw.

In this case the piston rod 62 is preferably laterally bent at 91, and the cylinder housing may be provided with a lateral extension having an aperture for slidably receiving the upwardly extending end 94 of the piston rod 62. The upper end of the piston rod is threaded at 95 and provided with a pair of nuts 96 for securing a pair of metal clips 97, 98 on the piston rod end. These metal clips both are provided with apertures 99 for passing the piston rod, and both clips have an attachment flange to be received between the nuts 96.

The clip 98 has its end formed with a partially cylindrical clamping member 100 for receiving the wire 88. The clip 97 is also preferably provided with a curved end 101, which is adapted to retain the wire between the clips. The proportions of the wire-engaging parts 100, 101 of these clips are such that when the clips are forced together by the nuts 96 they tightly engage the wire portion 88. The piston is thus adapted to have its rod 62 fixedly secured to the spring 85 in such manner that the piston 61 reciprocates with the spring 85, which urges the plunger 21 upward.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by United States Letters Patent is:

1. An air pump attachment for jig saws, adapted to effect its pumping stroke on the upward movement of the saw under the influence of a spring, comprising a metal member formed with a cylinder, said cylinder having its lower end open, and said cylinder having its lower end flared outwardly toward its opening over a substantial portion of the length of the cylinder, a conduit in said metal member communicating with the upper end of said cylinder, and having a fitting for receiving a hose, a hose leading from said conduit and engaging a nozzle member, said nozzle member having its nozzle opening downwardly directed toward the working area of the saw blade, and said nozzle member being supported by an adjustable collar adapted to be mounted on a saw guide supporting rod, a piston rod, and a piston carried by said rod, said piston rod having a reduced end portion, and a shoulder between said reduced portion, and the shank of said rod and said piston comprising a metal plate mounted against said shoulder on said reduced portion, said plate being substantially smaller than the bore in said cylinder, a cup leather having its body provided with a central opening receiving said reduced portion, said cup leather engaging said plate, and a second plate located inside said cup leather and engaging the top of said cup leather on said reduced portion, said reduced portion being riveted over to clamp said cup leather between said plates, and means carried by said connecting rod for securing the end of the connecting rod to a part movable with the saw blade whereby air is forced through said conduits on the up stroke of the blade and on the down stroke of the blade at the lower part of the cylinder, the cup leather being spaced from the wall of the cylinder for effecting a filling of the cylinder with air preliminary to a pumping stroke.

2. An air pump attachment for jig saws, adapted to effect its pumping stroke on the upward movement of the saw under the influence of a spring, comprising a metal member formed with a cylinder, said cylinder having its lower end open, and said cylinder having its lower end flared outwardly toward its opening over a substantial portion of the length of the cylinder, a conduit in said metal member communicating with the upper end of said cylinder, and having a fitting for receiving a hose, a hose leading from said conduit and engaging a nozzle member, said nozzle member having its nozzle opening downwardly directed toward the working area of the saw blade, and said nozzle member being supported by an adjustable collar adapted to be mounted on a saw guide supporting rod, a piston rod, and a piston carried by said rod, said piston rod having a reduced end portion, and a shoulder between said reduced portion, and the shank of said rod and said piston comprising a metal plate mounted against said shoulder on said reduced portion, said plate being substantially smaller than the bore in said cylinder, a cup leather having its body provided with a central opening receiving said reduced portion, said cup leather engaging said plate, and a second plate located inside said cup leather and engaging the top of said cup leather on said reduced portion, said reduced portion being rivited over to clamp said cup leather between said plates, and means carried by said connecting rod for securing the end of the connecting rod to a part movable with the saw blade whereby air is forced through said conduits on the up stroke of the blade and on the down stroke of the blade at the lower part of the cylinder, the cup leather being spaced from the wall of the cylinder for effecting a filling of the cylinder with air preliminary to a pumping stroke, said latter means comprising a collar having an outwardly extending flange provided with an aperture for receiving a laterally bent end portion of said piston rod, and threaded members on said rod for engaging said flange.

THERON L. HEDGPETH.